United States Patent [19]
Ward et al.

[11] Patent Number: 5,752,734
[45] Date of Patent: May 19, 1998

[54] RAIL COMPONENTS FOR PICK-UP OR FLAT-BED TRUCKS TO SUPPORT SIDE OR BACK PIECES

[76] Inventors: Kenneth L. Ward, 8511 Scott La., Machesney Park, Ill. 61115; George M. Jameson, Sr., 950 E. Riverside Blvd., Love's Park, Ill. 61111

[21] Appl. No.: 225,778

[22] Filed: Apr. 11, 1994

[51] Int. Cl.$^6$ .................................................. B60P 3/00
[52] U.S. Cl. .................................... 296/3; 296/32
[58] Field of Search ............................ 296/3, 32, 36

[56] References Cited

U.S. PATENT DOCUMENTS

| | | | |
|---|---|---|---|
| 1,022,266 | 4/1912 | Saltzman et al. | 296/36 |
| 2,751,248 | 6/1956 | Kritser | 296/32 |
| 3,940,179 | 2/1976 | McBride | 296/36 |
| 4,152,020 | 5/1979 | Brown et al. | 296/3 |
| 4,278,175 | 7/1981 | Jackson | 296/3 |
| 4,405,170 | 9/1983 | Raya | 296/3 |
| 4,423,899 | 1/1984 | Langmead | 296/3 |
| 5,476,301 | 12/1995 | Berkich | 296/3 |
| 5,628,540 | 5/1997 | James | 296/3 |

*Primary Examiner*—Gary C. Hoge

[57] ABSTRACT

A rail component for pick-up and flat-bed trucks to support side or back pieces comprising a plurality of vertically disposed support rails positioned around the periphery of a rear portion of a truck, each support rail including a C-shaped channel with a back wall at its central extent and with extension plates at right angles therefrom being provided with screw holes in a vertical array, a supplemental back wall with extension plates and with the back walls spaced at right angles from each other, each back wall having at least one aperture.

7 Claims, 5 Drawing Sheets

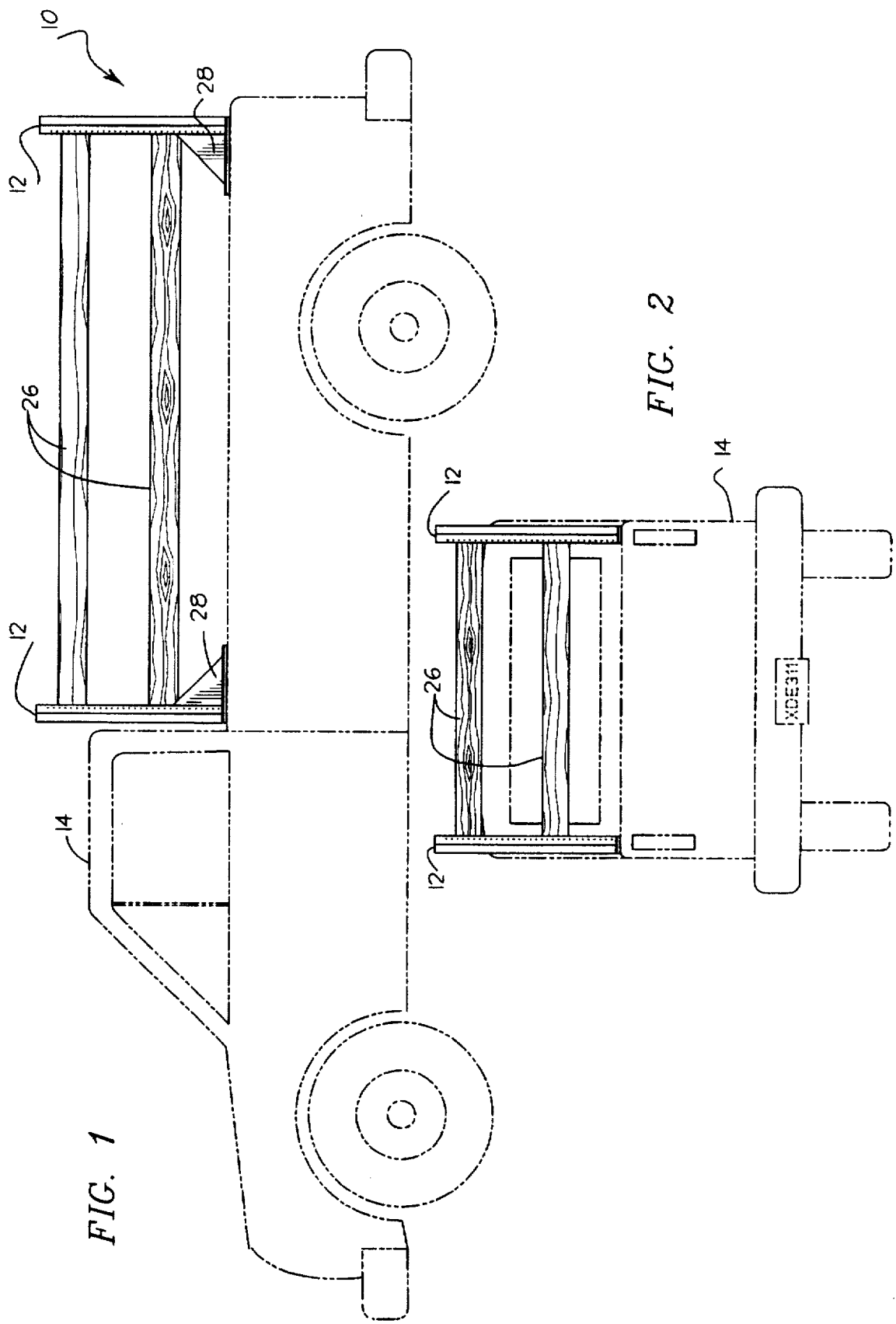

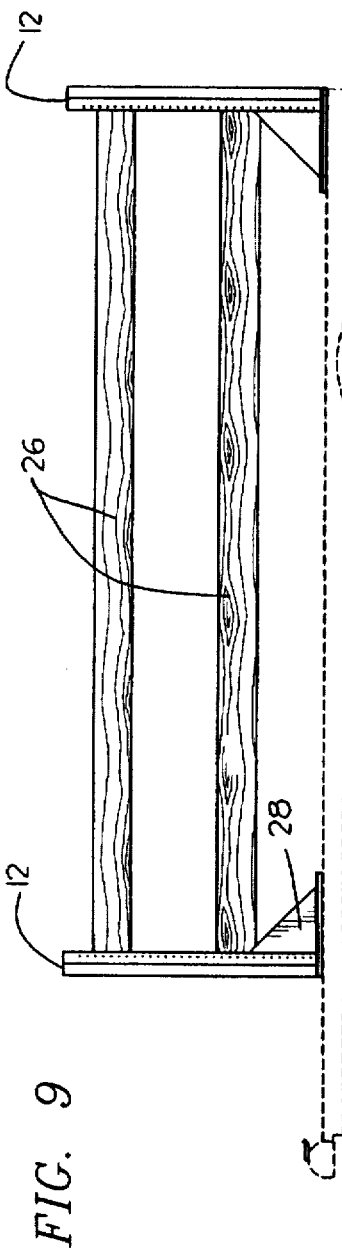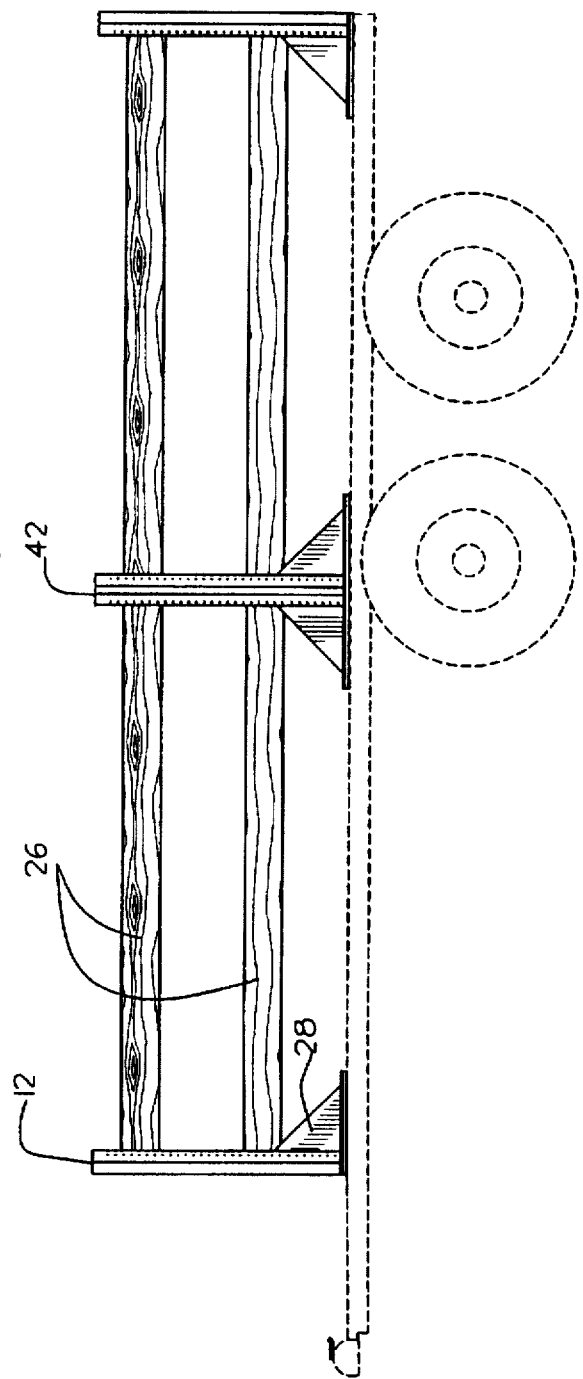

5,752,734

1

RAIL COMPONENTS FOR PICK-UP OR FLAT-BED TRUCKS TO SUPPORT SIDE OR BACK PIECES

BACKGROUND OF THE INVENTION

1. Field of the Invention

The present invention relates to rail components for pick-up or flat-bed trucks to support side or back pieces and more particularly pertains to supporting panels on trucks through conveniently positioned rails with channels and supports therein.

2. Description of the Prior Art

The use of truck panels and supports is known in the prior art. More specifically, truck panels and supports heretofore devised and utilized for the purpose of employing side panels, back panels, etc., on pick-up or flat-bed trucks are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,659,131 to Flournoy, Jr. discloses a rack for a pick-up truck.

U.S. Pat. No. 4,770 458 to Burke et al discloses an utility rack for pickup truck.

U.S. Pat. Nos. 5,005,892 and 5,061,000 to Haugen et al disclose a rack for pickup truck and a rack for body of pickup truck.

U.S. Pat. No. 5,037,152 to Hendricks discloses a collapsible truck rack.

Lastly, U.S. Pat. No. 5,137,320 to Christensen discloses a ladder utility rack and mounting rail.

In this respect, the rail components for pick-up or flat-bed trucks to support side or back pieces according to the present invention substantially departs from the conventional concepts and designs of the prior art, and in doing so provides an apparatus primarily developed for the purpose of supporting panels on trucks through conveniently positioned rails with channels and supports therein.

Therefore, it can be appreciated that there exists a continuing need for rail components for pick-up or flat-bed trucks to support side or back pieces which can be used for supporting panels on trucks through conveniently positioned rails with channels and supports therein. In this regard, the present invention substantially fulfills this need.

SUMMARY OF THE INVENTION

In view of the foregoing disadvantages inherent in the known types of truck panels and supports now present in the prior art, the present invention provides improved rail components for pick-up or flat-bed trucks to support side or back pieces. As such, the general purpose of the present invention, which will be described subsequently in greater detail, is to provide a rail components for pick-up or flat-bed trucks to support side or back pieces and method which has all the advantages of the prior art and none of the disadvantages.

To attain this, the present invention essentially comprises new and improved rail components for pick-up and flat-bed trucks to support side and back pieces comprising, in combination, a plurality of vertically disposed support rails positioned around the periphery of a rear portion of a truck, each support rail including a C-shaped channel with a back wall at its central extent and with extension plates at right angles therefrom being provided with screw holes in a vertical array, a supplemental back wall with extension plates and with the back walls spaced at right angles from each other, each back wall having a pair of vertically spaced apertures; a triangular support located at the lower extent of at least one of the rails; a plurality of support clips, the support clips being in an inverted L-shaped configuration with an outwardly extending horizontal projection adapted to be received between parallel extension plates with the projection extending through a preselected aperture for determining the elevational orientation thereof; and a triangular structure formed of a hollow horizontal section of a channel like configuration, an upper diagonal section coupled at its outboard end to the outboard end of the horizontal section and a vertical section secured to the inboard end of the horizontal and diagonal sections and adapted to be coupled between support rails adjacent to the forward end of the truck with a C-shaped channel having a back wall with extension plates positioned at the outboard ends of the horizontal and diagonal sections for cooperation with a similar component at a remote location on the opposite side of the truck, the back walls having a pair of vertically spaced apertures.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide rail components for pick-up or flat-bed trucks to support side or back pieces which have all the advantages of the prior art truck panels and supports and none of the disadvantages.

It is another object of the present invention to provide rail components for pick-up or flat-bed trucks to support side or back pieces which may be easily and efficiently manufactured and marketed.

It is further object of the present invention to provide rail components for pick-up or flat-bed trucks to support side or back pieces which are of durable and reliable constructions.

An even further object of the present invention is to provide rail components for pick-up or flat-bed trucks to support side or back pieces which are susceptible of a low cost of manufacture with regard to both materials and labor, and which accordingly are then susceptible of low prices of sale to the consuming public, thereby making such rail components for pick-up or flat-bed trucks to support side or back pieces economically available to the buying public.

Still yet another object of the present invention is to provide rail components for pick-up or flat-bed trucks to support side or back pieces which provide in the apparatuses and methods of the prior art some of the advantages thereof, while simultaneously overcoming some of the disadvantages normally associated therewith.

Even still another object of the present invention is to support panels on trucks through conveniently positioned rails with channels and supports therein.

Lastly, it is an object of the present invention to provide a rail component for pick-up and flat-bed trucks to support side or back pieces comprising a plurality of vertically disposed support rails positioned around the periphery of a rear portion of a truck, each support rail including a C-shaped channel with a back wall at its central extent and with extension plates at right angles therefrom being provided with screw holes in a vertical array, a supplemental back wall with extension plates and with the back walls spaced at right angles from each other, each back wall having at least one aperture.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the preferred embodiment of the rail components for pick-up or flat-bed trucks to support side or back pieces constructed in accordance with the principles of the present invention.

FIG. 2 is a rear elevational view of the device illustrated in FIG. 1.

FIG. 9 is a side elevational view of the device adapted for use on a short trailer.

FIG. 10 is a side elevational view of the device adapted to be used on a long trailer.

The same reference numerals refer to the same parts through the various Figures.

DESCRIPTION OF THE PREFERRED EMBODIMENT

Figure 4:
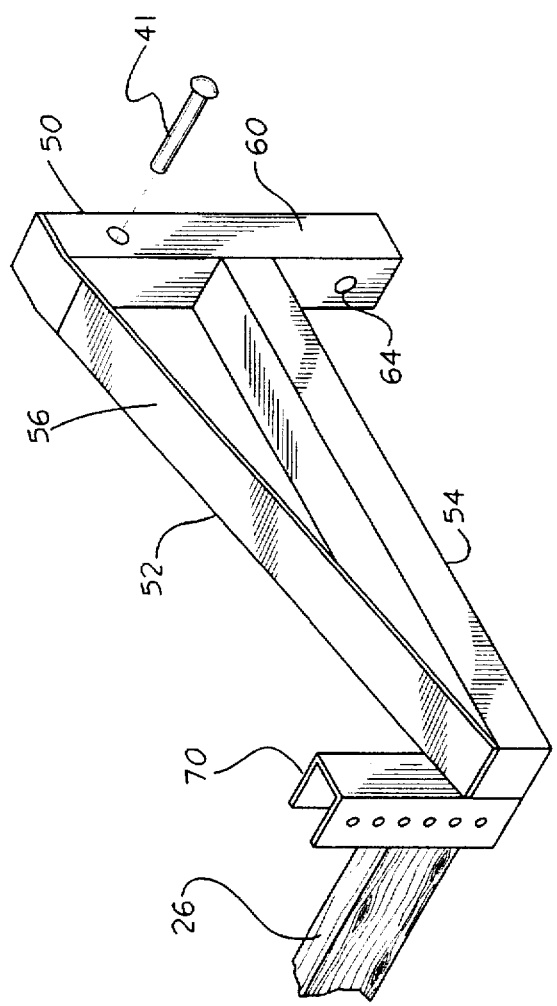
FIG. 4 is a perspective illustration of a alternate embodiment of the invention for supporting members over the cab of a pick-up or flat-bed truck.
Figure 3:
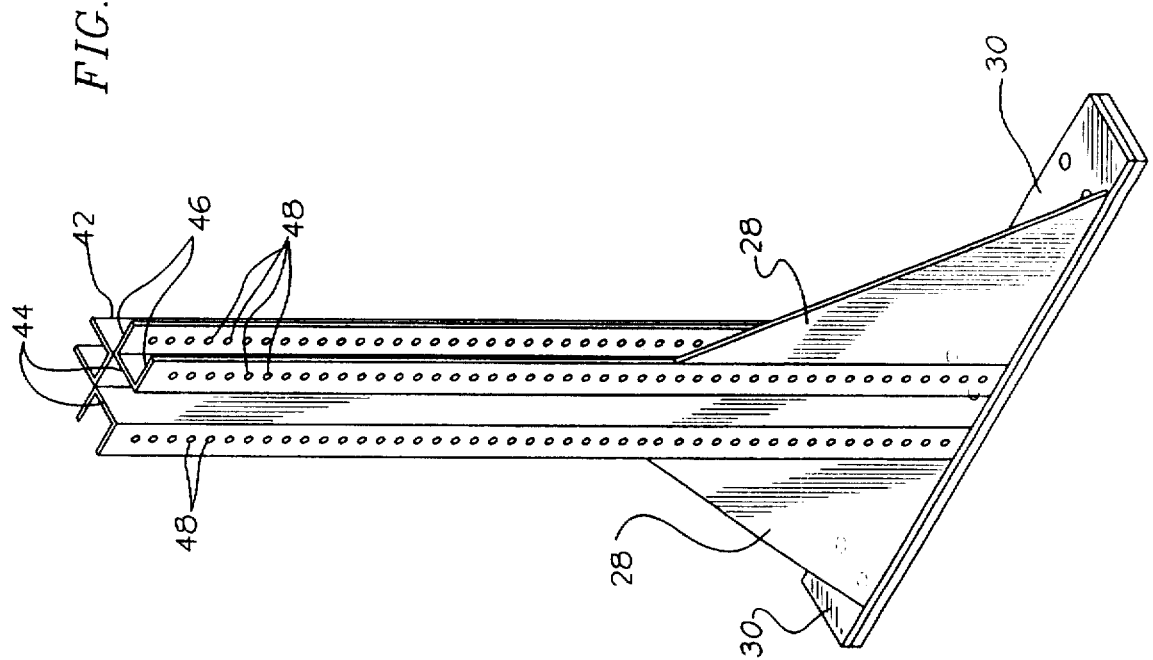
FIG. 3 is an enlarged perspective illustration of a supplemental support rail usable with the support rails shown in FIGS. 1 and 2.

With reference now to the drawings, and in particular to FIG. 1 thereof, the preferred embodiment of the rail components for pick-up or flat-bed trucks to support side or back pieces embodying the principles and concepts of the present invention and generally designated by the reference numeral 10 will be described.

Specifically, the present invention, the new and improved rail component for pick-up or flat-bed trucks to support side or back pieces includes a plurality of components 10. Such components, in their broadest context, include support rails, a triangular support, a plurality of support clips, a central rail, a triangular structure and a plurality of slats. Such components are individually configured and correlated one with respect to the other so as to attain the desired objective.

Figure 5:
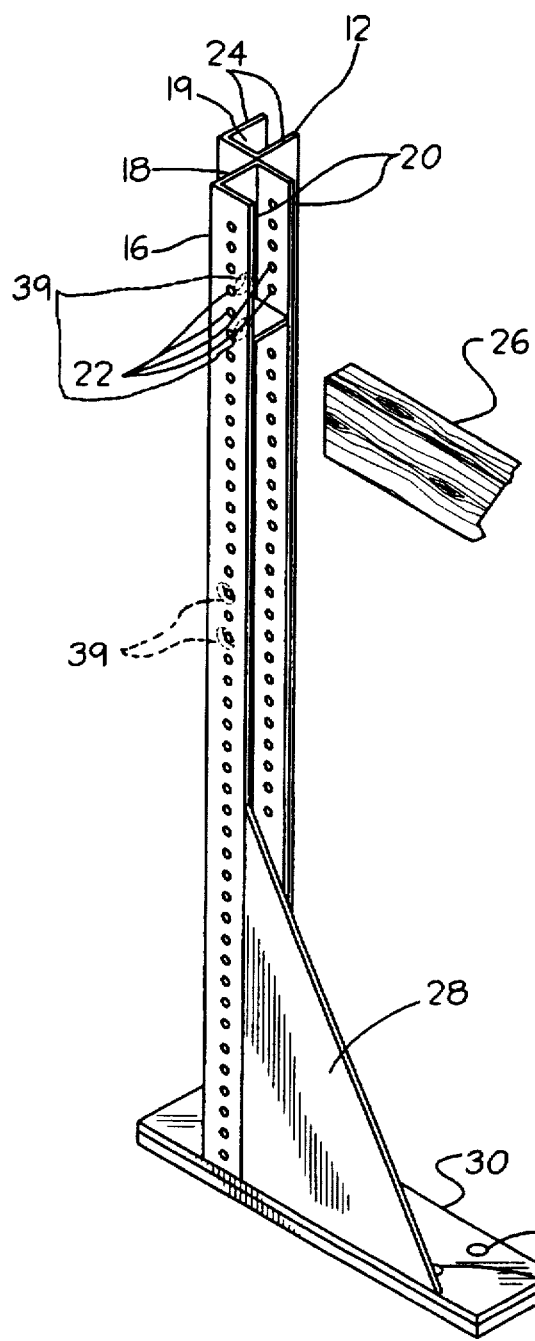
FIG. 5 is an enlarged perspective view of one of the support rails shown in FIGS. 1 and 2.

More specifically, the central component of the system 10 involves a plurality of vertically disposed support rails 12. Note in particular FIG. 5. Such support rails are positioned around the periphery of the rear portion of a truck 14. They are intended for corner positioning. Each such support rail includes a C-shaped channel 16 with a back wall 18 at their central extent. They also include parallel extension plates 20 at right angles from the back plate. Such extension plates are provided with screw holes 22 in a vertical array. A supplemental back plate 19 with supplemental extension plates 24 are spaced with the back plates at right angles from each other. The supplemental extension plates have similar screw holes 22. Each pair of parallel apertured plates are for receiving and supporting an end of a slat 26. At the lower end of each support rail is a triangular support 28. Such triangular support is for support and is located at the lower extent of at least one of the rails of the device. The lower end includes a horizontal section 30 with apertures 32 for mounting onto the truck.

Figure 6:
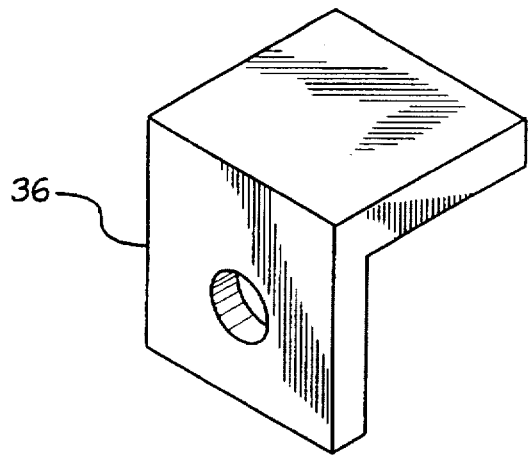
FIG. 6 shows a support clip for positioning at a predetermined height within the support rails of the prior Figures.

Located within the parallel apertured walls is at least one support clip 36. Each support clip is formed in an inverted L-shaped configuration. Note FIG. 6. Each plate has on its exterior surface a horizontal outwardly extending projection 38. Such projections are sized and configured for being adapted to be received between parallel extension plates 24 with the projections extending through one preselected pair of vertically spaced apertures 37 or 39. Such a relationship of two holes only one of which is used at any time, is for determining the elevational orientation of the clip and supported slat.

Figure 7:
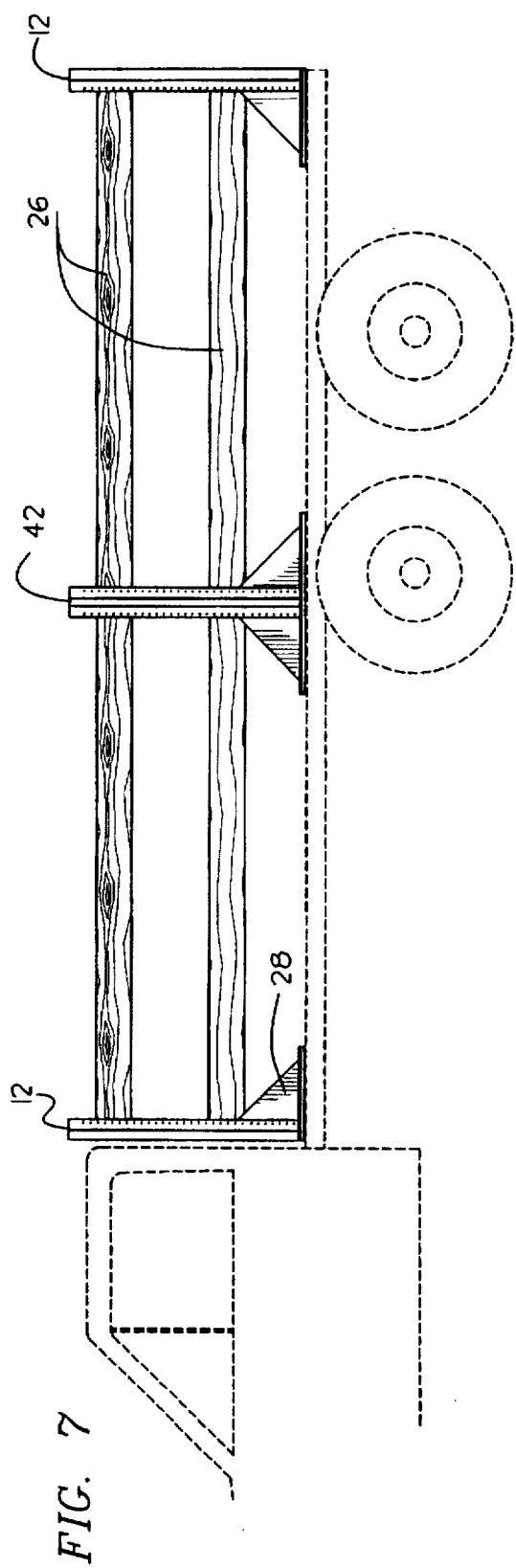
FIG. 7 is illustrates an alternate embodiment of the invention employing the central rail support of FIG. 3 on an elongated flat-bed truck.

For use with longer trucks as shown in FIG. 7 or longer truck beds as shown in FIG. 10, there is provided a vertically disposed central rail 42. Such central rail is formed of parallel imperforate side walls 44. Extension plates 46 thereof extend in opposite directions. Such extension plates are provided with apertures 48 in vertical alignment. Such parallel plates and apertures are for receiving clips 36 in the manner as the above discussed with respect to the corner support rails 12. Opposed triangular supports 28 are located at the bottom of the rail 42 for support with an apertured plate 30 therebeneath for coupling to the truck.

The final type of parallel apertured plates is shown in FIG. 4. Such structure includes a triangular section 52 formed of a hollow horizontal section 54. Such member is of a rectangular channel like configuration. In association therewith is an upper diagonal section 56. Such piece is coupled at its outboard end to the outboard end of the horizontal section. In addition, a vertical section 60 is secured to the inboard end of the horizontal and diagonal sections. It is located adjacent the forward end of the bed of a truck. In such orientation, the horizontal and diagonal sections can extend over the top of the truck. Apertures 64 are located on the vertical member for coupling with apertures of an adjacent side plate with a pin 41 extending therethrough for a secure coupling.

The triangular structure described above is repeated on the opposite side of the bed adjacent the cab. In this manner, a support slat 26 may be positioned between apertured channel members 70 secured to the interiorly facing surfaces at the outboard ends of the horizontal and diagonal sections. Coupling is by screws extending through screw holes 48.

Figure 8:
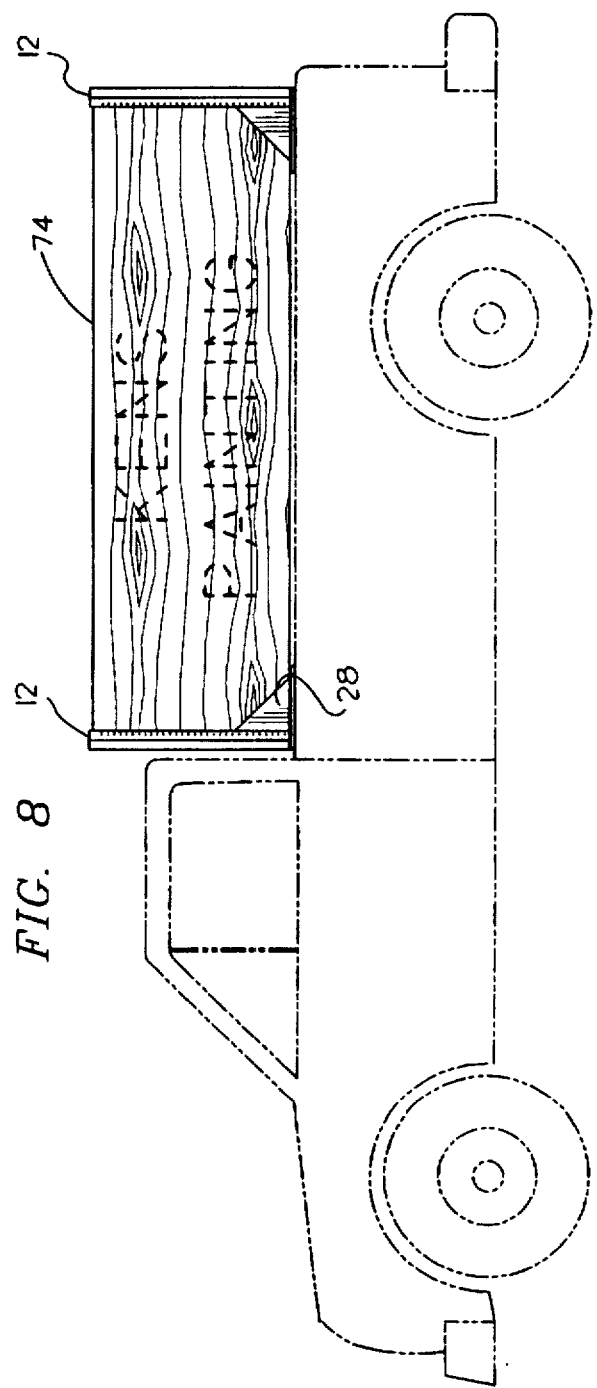
FIG. 8 is a side elevational view of a further alternate embodiment wherein the support clips are eliminated.

The last feature of the present invention is shown in FIG. 8. In such embodiment, the clips are not utilized. Further, instead of slats 26 extending between adjacent vertical support rails, a plywood sheet 74 is positioned at each and between the apertured parallel plates. Advertising is preferably located on the exterior face of such plywood.

The various Figures illustrate various combinations of components for supporting slats and plywood sheets on various types of pickup trucks or flatbed trucks.

The present invention has been designed to enable pick-up truck owners to quickly and easily install an equipment rack in their truck beds.

The present invention can be installed in minutes by one person. It bolts on or clamps on, no need to drill holes. The present invention disassembles for ease in storage and hauls work equipment or recreational gear. Trucks with caps can also be equipped with the present invention. Pads under the brackets will eliminate scratches on the exterior finish. The present invention will fit on most any model pick-up or flatbed truck and is very and is very versatile and affordable. It can be placed on utility trailers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. New and improved rail components for pick-up and flat-bed trucks to support side and back pieces comprising, in combination:

a plurality of vertically disposed support rails positioned around the periphery of a rear portion of a truck, each support rail including a C-shaped channel with a back wall at its central extent and with extension plates at right angles therefrom being provided with screw holes in a vertical array, a supplemental back wall with extension plates and with the back walls spaced at right angles from each other, each back wall having a pair of vertically spaced apertures;

a triangular support located at the lower extent of at least one of the rails;

a plurality of support clips, the support clips being in an inverted L-shaped configuration with an outwardly extending horizontal projection adapted to be received between parallel extension plates with the projection extending through a preselected aperture for determining the elevational orientation thereof; and a triangular structure formed of a hollow horizontal section of a channel like configuration, an upper diagonal section coupled at its outboard end to the outboard end of the horizontal section and a vertical section secured to the inboard end of the horizontal and diagonal sections and adapted to be coupled between support rails adjacent to the forward end of the truck with a C-shaped channel having a back wall with extension plates positioned at the outboard ends of the horizontal and diagonal sections for cooperation with a similar component at a remote location on the opposite side of the truck, the back walls having a pair of vertically spaced apertures.

2. A rail component for pick-up and flat-bed trucks to support side or back pieces comprising:

a plurality of vertically disposed support rails positioned around the periphery of a rear portion of a truck, each support rail including a C-shaped channel with a back wall at its central extent and with extension plates at right angles therefrom being provided with screw holes in a vertical array, a supplemental back wall with extension plates and with the back walls spaced at right angles from each other, each back wall having at least one aperture.

3. The device as set forth in claim 2 and further including:

a support located at the lower extent of at least one of the rails.

4. The device as set forth in claim 2 and further including:

a plurality of support clips, the support clips being in an inverted L-shaped configuration with an outwardly extending horizontal projection adapted to be received between parallel extension plates with the projection extending through a preselected aperture for determining the elevational orientation thereof.

5. The device as set forth in claim 2 and further including:

a triangular structure formed of a hollow horizontal section of a channel like configuration, an upper diagonal section coupled at its outboard end to the outboard end of the horizontal section and a vertical section secured to the inboard end of the horizontal and diagonal sections and adapted to be coupled between support rails adjacent to the forward end of the truck with a C-shaped channel having a back wall with extension plates positioned at the outboard ends of the horizontal and diagonal sections for cooperation with a similar component at a remote location on the opposite side of the truck, the back walls having at least one aperture.

6. The device as set forth in claim 4 and further including slats positionable on the clips.

7. The device as set forth in claim 4 and further including ply-wood sheets positionable in the rails without the benefit of the clips.

* * * * *